(12) United States Patent
Chen et al.

(10) Patent No.: US 9,537,305 B2
(45) Date of Patent: Jan. 3, 2017

(54) TOUCH CONTROL DEVICE WITH ENHANCED ESD PROTECTION EFFECT

(71) Applicants: INTERFACE OPTOELECTRONICS (SHENZHEN) CO., LTD., Shenzhen, Guangdong (CN); GENERAL INTERFACE SOLUTION LIMITED, Miaoli County (TW)

(72) Inventors: Yen-Hua Chen, Guangdong (CN); Ruey-Shing Weng, Guangdong (CN); Chi-Yuan Tseng, Guangdong (CN)

(73) Assignees: Interface Optoelectronics (Shenzhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 140 days.

(21) Appl. No.: 14/555,791

(22) Filed: Nov. 28, 2014

(65) Prior Publication Data

US 2016/0149401 A1    May 26, 2016

(30) Foreign Application Priority Data

Nov. 21, 2014    (CN) .......................... 2014 1 0677265

(51) Int. Cl.
*H02H 9/04* (2006.01)
*G06F 3/01* (2006.01)

(52) U.S. Cl.
CPC ............... *H02H 9/04* (2013.01); *H02H 9/044* (2013.01); *G06F 3/01* (2013.01)

(58) Field of Classification Search
CPC ........................................................ H02H 9/04
USPC ............................................................ 361/56
See application file for complete search history.

(56) References Cited

U.S. PATENT DOCUMENTS

| 2014/0028582 A1* | 1/2014 | Choi | ...................... G06F 3/041 |
| | | | 345/173 |
| 2015/0092306 A1* | 4/2015 | Hou | ..................... H01L 27/0296 |
| | | | 361/42 |

* cited by examiner

*Primary Examiner* — Scott Bauer
(74) *Attorney, Agent, or Firm* — Rosenberg, Klein & Lee

(57) ABSTRACT

A touch control device with enhanced ESD protection effect comprises a sensing circuit module; a plurality of signal lines electrically connected with the sensing circuit module; an ESD protection ring disposed on periphery of the sensing circuit module and the signal lines; and an ESD shield ring interposed between the signal lines and the ESD protection ring. A touch on the sensing circuit module induces a sensation signal. While the signal lines transmit the sensation signal, the electrostatic charges generated thereby is drained off by the ESD protection ring. The ESD shield ring can drain off the residual electrostatic charges that the ESD protection ring does not drain off. Therefore, the present invention can exempt the touch control device from ESD interference, guarantee the accuracy of signal transmission, and protect the electronic elements of the touch control device.

14 Claims, 2 Drawing Sheets

TOUCH CONTROL DEVICE WITH ENHANCED ESD PROTECTION EFFECT

This application claims priority for China patent application no. 201410677265.5 filed at Nov. 21, 2014, the content of which is incorporated by reference in its entirely.

BACKGROUND OF THE INVENTION

Field of the Invention

The present invention relates to an ESD (Electrostatic Discharge) protection technology, particularly to a touch control device with enhanced ESD protection effect.

Description of the Related Art

With advance of display panel technology and popularization of consumer electronic products, more and more touch panels or touchscreens are used as the operating interfaces of electronic products, from the military devices to hi-tech electronic appliances. A touch control device, such as a touch panel or a touchscreen, can detect touches. In the field of touch control, a touch is normally referred to a contact of a finger (or a hand) with the sensing region of a touch control device. However, the sensing region of a touch control device can also sense the contact of other objects, such as a touch control stylus. Touch control devices have many applications, such as operating interfaces of portable electronic devices and tablet computers.

The touch control device has two significant advantages: the user can directly interact with the information displayed on the screen; and no intermediate device, such as the mouse or the keyboard, is required between the user and the electronic product. Touch control devices not only are used in larger computers and mechanical apparatuses but also are applied to smaller electronic products, such as personal digital assistants (PDA), GPS (Global Positioning System) navigation devices, mobile phones, video garners, etc. Because of simple operation and diversified functions, touch control devices are more and more popularized in daily life.

According to the operation principles, the touch control devices may be classified into four types: the resistive type, the capacitive type, the optical type and the ultrasonic type. The resistive touch control device comprises upper and lower ITO (Indium Tin Oxide) conductive layers, spacers and electrodes, wherein two pieces of ITO glass are used as the substrates; ITO films are respectively disposed on the substrates; spacers are interposed between two substrates to prevent from conduction between two substrates; silver electrodes are printed on the edges of the substrates for supplying voltage. The capacitive touch control device comprises a glass insulator coated with a transparent conductor (such as sensing electrodes made of ITO), and a touch sensor IC (Integrated Circuit) electrically connected with sensing electrodes and measuring capacitive variation in the electrodes, wherein the capacitive variation is used as a sensation signal, and the touch sensor IC receives the sensation signal and points out the contact position. The optical touch control device operates according to the blocked light beam and comprises glass substrates, infrared sources and infrared receivers, wherein many infrared sources and infrared receivers are distributed on the device and arranged to form an array; while an infrared light beam is blocked, some infrared receivers cannot receive infrared light; the contact position is worked out according to positions of the infrared receivers unable to receive infrared light. The ultrasonic touch control device comprises transmission transducers, reception transducers, reflector boards and a controller, wherein transmission transducers, reflector boards and reception transducers are arranged on each of the X coordinate and the Y coordinate of a piece of glass.

When the user operates the touch control device, the electrostatic charges carried by the finger are likely to conduct to the screen of the touch control device and induce ESD. The withstanding voltage of the circuits inside the touch control device is normally only tens of volts. ESD may substantially affect or damage the circuits and electronic elements inside the touch control device. For example, ESD may cause screen defects, melt metal conduction lines, vary the resistance of elements, damage or puncture oxide layers, cause malfunctions of the circuits and controllers centering around the processor. Any of the abovementioned events would significantly decrease the service life of the touch control device and affect the reliability of signal transmission.

Refer to FIG. 1 a plan view schematically showing a touch control device using the conventional ESD protection technology. In the conventional touch control device 10 shown in FIG. 1, an ESD protection ring 16 is disposed on the periphery of a sensing region 12 and a plurality of signal lines 14. Once a user touches the touch control device 10, the sensing region 12 generates a sensation signal, and the signal lines 12 transmit the sensation signal to the control unit of the touch control device 10, wherein the signal lines and the control unit transmit signals reciprocally. Electrostatic charges are likely to form during signal transmission and likely to appear in the signal lines 14 and the sensing circuit module. The ESD protection ring 16 is to drain off electrostatic charges, whereby to protect the electronic elements in the sensing circuit module and maintain the correctness and integrality of signal transmission.

Although the conventional technology has installed an ESD protection ring on the periphery of the signal lines and electronic elements of the touch control device, the ESD protection ring cannot drain off all electrostatic charges but can only prevent from a half of electrostatic discharges. Therefore, the conventional touch control device still risks electrostatic discharges, which may shorten the service life of the device and lower reliability of signal transmission.

In order to overcome the conventional problems, the present invention proposes a touch control device with enhanced ESD protection effect, which additionally installs an ESD shield between the signal lines and the ESD protection ring to achieve a full ESD protection effect.

SUMMARY OF THE INVENTION

The primary objective of the present invention is to provide a touch control device with enhanced ESD (Electrostatic Discharge) protection effect, which uses an ESD shield ring interposed between an ESD protection ring and signal lines to drain off the residual electrostatic charges that the ESD protection ring does not drain off and the residual electrostatic charges remaining in the signal lines or the sensing circuit, whereby to achieve a full ESD protection effect.

In order to achieve the abovementioned objective, the present invention proposes a touch control device with enhanced ESD protection effect, which comprises a sensing circuit module; a plurality of signal lines electrically connected with the sensing circuit module; an ESD protection ring disposed on the periphery of the sensing circuit module and the signal lines; and an ESD shield ring interposed between the signal lines and the ESD protection ring. The electrostatic charges generated at the time that the sensing circuit module and the signal lines transmit signals are conducted to the ESD protection ring and drained off by the ESD protection ring. The ESD shield ring drains off the residual electrostatic charges that the ESD protection ring does not drain off. The present invention can completely drain off electrostatic charges, guaranteeing reliability of signal transmission and protecting the electronic elements in the touch control device.

Below, embodiments are described in detail in cooperation with the attached drawings to make easily understood the objectives, technical contents, characteristics and accomplishments of the present invention.

DETAILED DESCRIPTION OF THE INVENTION

The present invention discloses a touch control device with enhanced ESD protection effect, which uses an ESD (Electrostatic Discharge) protection ring and an ESD shield ring to drain off the electrostatic charges generated at the time that the sensing circuit module and the signal lines transmit signals, whereby to protect the precision electronic elements of the touch control device, guarantee the integrality of signal transmission, and maintain the sensitivity of the touch control device. The ESD protection ring and the ESD shield ring of the present invention are made of a metallic material, which favors the ESD protection ring and the ESD shield ring to attract electrostatic charges. The width of the ESD shield ring is smaller than that of the ESD protection ring. Each of the ESD protection ring and the ESD shield ring may be fabricated with two looped metallic lines to have a ring-like shape. The electric connections of the ESD protection ring and an ESD shield ring in the touch control device of the present invention will be described below.

Figure 1:
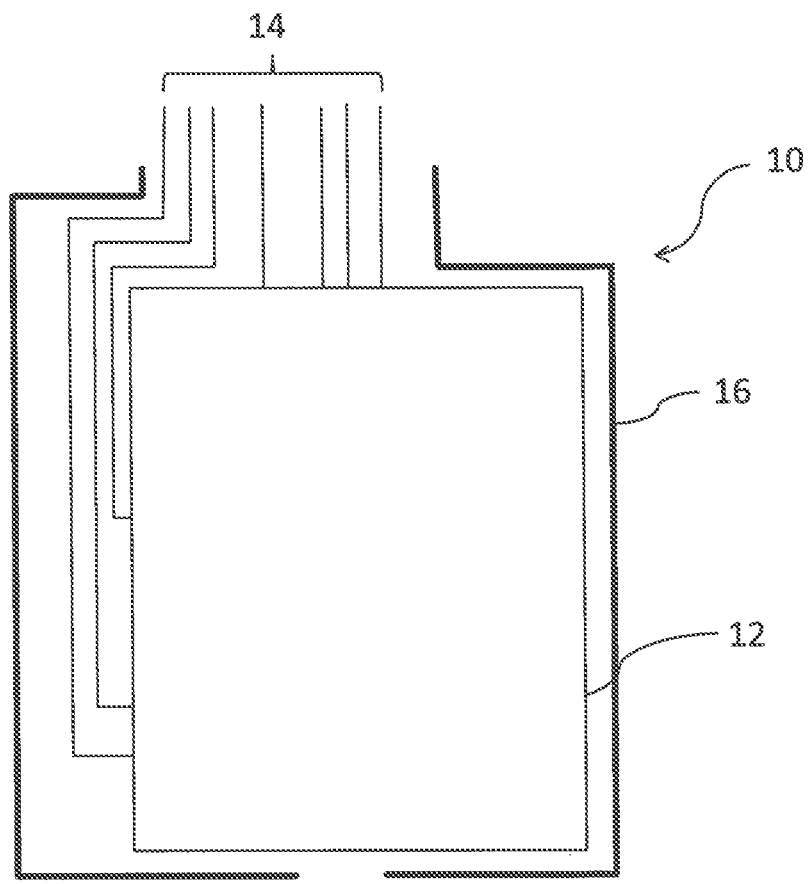
FIG. 1 is a plan view schematically showing a touch control device using the conventional ESD protection technology.
Figure 2:
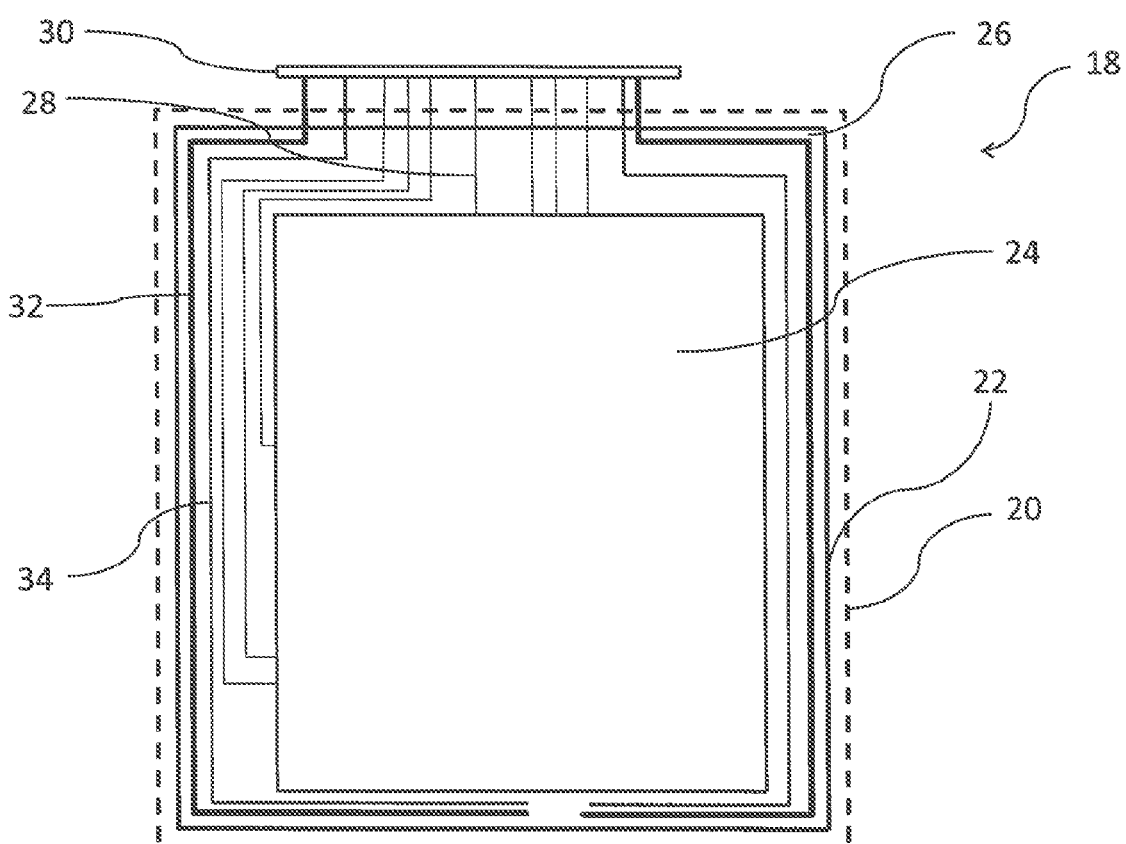
FIG. 2 is a plan view schematically showing a touch control device with enhanced ESD protection effect according to one embodiment of the present invention.

Refer to FIG. 2 schematically showing a touch control device with enhanced ESD protection effect according to one embodiment of the present invention. The device 18 of the present invention comprises a sensing circuit module 20, a plurality of signal lines 28, an ESD protection ring 32 and an ESD shield ring 34. The sensing circuit module 20 has a transparent conductive layer 22. In one embodiment, the transparent conductive layer 22 is made of indium tin oxide (ITO). The transparent conductive layer 22 includes a sensing region 24 and a non-sensing region 26. The plurality of signal lines 28 electrically connects the sensing circuit module 20 with a driver/controller module 30. The driver/controller module 30 is electrically with the rows and columns of the sensing region 24 through the plurality of signal lines 28. The is plurality of signal lines 28 is disposed on the surface of the non-sensing region 26 and electrically connected with the sensing region 24. The ESD protection ring 32 is disposed on the surface of the non-sensing region 26, surrounding the periphery of the signal lines 28. The ESD shield ring 34 is disposed on the surface of the non-sensing region 26, surrounding the periphery of the signal lines 28 and interposed between the signal lines 28 and the ESD protection ring 32.

The above description demonstrates an embodiment of the ESD protection ring 32 and the ESD shield ring 34, which is mainly applied to the ITO-based sensing circuit module. Both the resistive sensing circuit and capacitive sensing circuit belong to the ITO-based sensing circuit. In the specification, the capacitive sensing circuit is used to exemplify the sensing circuit. While being touched, the sensing region 24 generates a sensation signal and transmits the sensation signal to the driver/controller module 30. The capacitive sensing circuit may be affected by the noise generated by electrostatic charges carried by a finger or another touch control medium. The ESD protection ring 32, which is directly grounded or connected with a grounding wire, drains off a great amount of electrostatic charges from the signal lines 28, the sensing region 24, the non-sensing region 26, and the driver/controller module 30 to the ground. However, some residual electrostatic charges may still remain in the circuits. The ESD shield ring 34, which is interposed between the signal lines 28 and the ESD protection ring 32, is also directly grounded or connected with a grounding wire. The ESD shield ring 34 attracts the residual electrostatic charges and drains the residual electrostatic charges to the ground. Thereby, the present invention can effectively protect the signal lines 28, the sensing region 24, the non-sensing region 26, the driver/controller module 30, and other electronic elements of the sensing circuit module 20 and guarantee that the sensation signals induced by touches can be effectively transmitted to the driver/controller module 30 and that the signals can be reciprocally transmitted without ESD interference.

The operation of the capacitive sensing circuit is based on the current variation induced by the interaction between the transparent electrodes and the electrostatic charges carried by a human body or another touch control medium. Thus, the influence of the noise generated by the electrostatic charges carried by a finger or another touch control medium must be excluded from the operation of the capacitive sensing circuit. Therefore, the device of the present invention further uses an ESD shield ring to enhance the ESD protection effect. Below, the experimental data in Table.1 are used to compare the anti-ESD effects of the present invention and the conventional technology. As mentioned above, the capacitive sensing circuit is used to exemplify the sensing circuit in the present invention. Therefore, the capacitive sensing circuit is used in the experiment to evaluate the contribution of the ESD shield ring. The experimental photomasks Type-1 and Type-2 of a capacitive sensing circuit are used in the experiment, wherein Type-1 has an ESD shield ring and Type-2 does not have an ESD shield ring. There are three types of experimental results: Pass (the signal lines are intact), Open (ESD explodes the signal lines to break), and Risk (the signal lines have traces of ESD explosion, but the function thereof is not affected). The present invention regards Pass and Open as major events having significant influences on the performance of the circuit and gives them a weighting value of 1. The present invention regards Risk as a minor event having less significant influence on the performance of the circuit and gives it a weighting value of 0.5. The weighted sum of the experimental results of Type-1 equals 92.86%. The weighted sum of the experimental results of Type-2 equals 42.86%. Therefore, the anti-ESD effect of Type-1 is higher than that of Type-2 by 50%. Therefore, the experiment proves that the present invention can effectively improve the ESD resistance.

TABLE 1

| Modification in the Experimental Photomasks | Type-1 | Type2 |
|---|---|---|
| 1. Modifying the grounding point | Yes | Yes |
| 2. Interposing an ESD shield ring between the ESD protection ring and the signal lines | Yes | No |
| 3. ITO pattern: arranging dummy between TX and RX | No | No |
| 4. Grounding of ESD and target, the design for TX discharge | No | No |
| Pass: the signal lines are intact | 4 | 0 |
| Percentage | 28.57% | 0.00% |
| Risk: the signal lines have traces of ESD explosion, but the function thereof is not affected | 10 | 12 |
| Percentage | 71.43% | 85.71% |
| Open: ESD explodes the signal lines to break | 0 | 2 |
| Percentage | 0.00% | 14.29% |
| The weighted sum of the experimental results | 92.86% | 42.86% |

Effects: Pass weighting value = 1; Risk weighting value = 0.5; Open weighting value = 1 (the standard: 100%)

A human body or other touch control media may carry electrostatic charges, and the electrostatic charges will be conducted to a touch control device while the human body or the other touch control media contact the touch control device. Moreover, a touch control device itself may generate intrinsic electrostatic charges thereinside. Therefore, electrostatic charges are likely to exist in a sensing circuit no matter what principle the sensing circuit is based on. In addition to the abovementioned capacitive sensing circuit, electrostatic charges may also appear in the other types of sensing circuits, such as the resistive sensing circuit and the optical sensing circuit, and affect the transmission of signals and degrade the stability of electronic elements. Nowadays, there are various types of touch control devices and touchscreens applied to products available in the market, such as mobile phones, tablet computers, notebook computers, machines, and vehicles. It is expected: touch control devices will replace keyboards and press-key operating interfaces in future, and further more apparatuses will be equipped with touch control devices. Since the ESD protection ring and the ESD shield ring of the present invention can effectively drain off electrostatic charges, they are suitable to install in various types of touch control devices for protecting signal transmission and guaranteeing reliability of touch control function and electronic elements.

In conclusion, the present invention installs the ESD protection ring and the ESD shield ring in a touch control device, such as a capacitive, resistive or optical touch control device, to drain electrostatic charges from the circuit thereof. Thereby, the present invention can protect the precision circuits and electronic elements of the touch control device, guarantee the integrality of signal transmission, and maintain the sensitivity of the touch control device.

The embodiments have been described above to demonstrate the technical thoughts and characteristics of the present invention to enable the persons skilled in the art to understand, make, and use the present invention. However, these embodiments are only to exemplify the present invention but not to limit the scope of the present invention. Any equivalent modification or variation according to the spirit of the present invention is to be also included within the scope of the present invention.

What is claimed is:

1. A touch control device with enhanced electrostatic discharge protection effect, comprising
  a sensing circuit module;
  a plurality of signal lines electrically connected with said sensing circuit module for transmitting signals;
  an ESD (Electrostatic Discharge) protection ring disposed on periphery of said sensing circuit module and said signal lines, wherein electrostatic charges generated at a time point that said signal lines transmit signals to said sensing circuit module are conducted to said ESD protection ring; and
  an ESD shield ring disposed on periphery of said sensing circuit module and said signal lines, interposed between said signal lines and said ESD protection ring, and draining off residual electrostatic charges that said ESD protection ring does not drain off;
  wherein a width of said ESD shield ring is smaller than a width of said ESD protection ring.

2. The touch control device with enhanced electrostatic discharge protection effect according to claim 1 further comprising a driver/controller module, which is electrically connected with said signal lines and controls signal transmission.

3. The touch control device with enhanced electrostatic discharge protection effect according to claim 2, wherein said driver/controller module controls signals from rows and columns of a 2-dimensional array of said sensing circuit module.

4. The touch control device with enhanced electrostatic discharge protection effect according to claim 1, wherein said sensing circuit module has a transparent conductive layer, and wherein said transparent conductive layer includes a sensing region and a non-sensing region.

5. The touch control device with enhanced electrostatic discharge protection effect according to claim 4, wherein said signal lines are disposed on said non-sensing region and electrically connected with said sensing region.

6. The touch control device with enhanced electrostatic discharge protection effect according to claim 5, wherein said ESD protection ring is disposed on a surface of said non-sensing region and runs along a belt outside said signal lines.

7. The touch control device with enhanced electrostatic discharge protection effect according to claim 6, wherein said ESD shield ring is disposed on a surface of said non-sensing region, runs along a belt outside said signal lines, and is interposed between said signal lines and said ESD protection ring.

8. The touch control device with enhanced electrostatic discharge protection effect according to claim 4, wherein said transparent conductive layer is made of indium tin oxide (ITO).

9. The touch control device with enhanced electrostatic discharge protection effect according to claim 1, wherein said sensing circuit module is a capacitive sensing circuit module, a resistive sensing circuit module, or an optical sensing circuit module.

10. The touch control device with enhanced electrostatic discharge protection effect according to claim 1 further comprising at least one grounding wire, which is electrically connected with said ESD protection ring and said ESD shield ring.

11. The touch control device with enhanced electrostatic discharge protection effect according to claim 1, wherein said ESD protection ring and said ESD shield ring are grounded.

12. The touch control device with enhanced electrostatic discharge protection effect according to claim 1, wherein said ESD protection ring and said ESD shield ring are made of a metallic material.

13. The touch control device with enhanced electrostatic discharge protection effect according to claim 1, wherein said ESD protection ring is formed of two looped metallic lines.

14. The touch control device with enhanced electrostatic discharge protection effect according to claim 1, wherein said ESD shield ring is formed of two looped metallic lines.

* * * * *